United States Patent [19]

Kawai

[11] Patent Number: 6,075,344
[45] Date of Patent: Jun. 13, 2000

[54] SECONDARY-BATTERY PROTECTION CONTROL

[75] Inventor: Toshimichi Kawai, Yamagata, Japan

[73] Assignee: NEC Corporation, Tokyo, Japan

[21] Appl. No.: 09/260,086

[22] Filed: Mar. 2, 1999

[30] Foreign Application Priority Data

Mar. 2, 1998 [JP] Japan ................................ 10-049355

[51] Int. Cl.[7] .................................................. H02J 7/00
[52] U.S. Cl. ........................................ 320/134; 320/128
[58] Field of Search ................................ 320/134, 120, 320/124, 128, 136

[56] References Cited

U.S. PATENT DOCUMENTS

| | | | |
|---|---|---|---|
| 5,387,857 | 2/1995 | Honda et al. | 320/120 |
| 5,621,298 | 4/1997 | Harvey | 320/134 |
| 5,684,384 | 11/1997 | Barkat et al. | 320/124 |
| 5,786,682 | 7/1998 | Aiken et al. | 320/136 |
| 5,903,423 | 5/1999 | Okano et al. | 320/107 |

FOREIGN PATENT DOCUMENTS

| | | |
|---|---|---|
| 5-300664 | 11/1993 | Japan . |
| 6-570050 | 8/1994 | Japan . |
| 8-116627 | 5/1996 | Japan . |
| 10-27630 | 1/1998 | Japan . |
| 10-56742 | 2/1998 | Japan . |
| 10-150721 | 6/1998 | Japan . |

OTHER PUBLICATIONS

English translation of Japanese Office Action dated Apr. 6, 1999 (Hei 11).

*Primary Examiner*—Edward H. Tso
*Assistant Examiner*—Lawrence Luk
*Attorney, Agent, or Firm*—Whitham, Curtis & Whitham

[57] ABSTRACT

In a battery pack including a battery composed of a plurality of secondary calls, a control device for a protection circuit of the battery from over-charging/discharging is disclosed. A cell voltage detector detects cell voltages of the second cells, respectively, and a battery voltage detector detects a battery voltage of the battery. A controller activates a circuit breaker to break an input/output circuit of the battery when the battery voltage does not match a total cell voltage obtained by adding the cell voltages.

22 Claims, 3 Drawing Sheets

SECONDARY-BATTERY PROTECTION CONTROL

BACKGROUND OF THE INVENTION

1. Field of the Invention

The present invention generally relates to a rechargeable battery pack having a plurality of secondary cells, and in particular to a protection control technique against over-charging and over-discharging

2. Description of the Related Art

Recently, a rechargeable battery or a secondary battery has been widely used as a power supply for portable or hand-held wireless communication equipment in consideration of running costs.

In general, a battery pack having a secondary battery such as lithium-ion battery therein is provided with a protection circuit for protecting the secondary battery from overcharging, over-discharging and overcurrent.

An example of such a protection circuit has been disclosed in Japanese Patent Laid-open No. 8-116627. This conventional protection circuit is provided with a first controller and a second controller. The first controller performs the on/off control of a switching circuit according to the output voltage of the secondary battery to adjust the charging current of the secondary battery. The second controller controls a cutoff circuit or a circuit breaker according to the charging voltage. More specifically, when the second controller judges that a fault condition occurs in the first controller under overcharging conditions, the second controller activates the circuit breaker so that the charging current is cut off. The circuit breaker is designed to automatically break and manually make a circuit. In this conventional protection circuit, a fuse circuit is used.

According to the above conventional protection circuit, however, the first and second controllers monitor the output voltage of the secondary battery to determine whether overcharging or over-discharging occurs. Therefore, if at least one of the first and second controllers is in fault conditions, resulting in incorrect detection of the battery output voltage, then there is a possibility that the secondary battery is subjected to overcharging or over-discharging.

Further, when detecting a charging voltage higher than a threshold, the first controller controls the switching circuit to turn it off. But, in case of the switching circuit being out of order, there is a possibility that the charging current is not cut off, resulting in the occurrence of overcharging or over-discharging.

SUMMARY OF THE INVENTION

An object of the present invention is to provide control method and device, which can effectively protect a secondary battery from overcharging and over-discharging.

Another object of the present invention is to provide a battery pack including a protection circuit with a self-diagnosis function to effectively protect a secondary battery from overcharging and over-discharging.

According to a first aspect of the present invention, in a battery pack including a battery composed of a plurality of secondary cells placed in a predetermined connection, a control device controls a protection circuit of the battery from over-charging/discharging. A first detector detects cell voltages of the secondary cells, respectively, and a second detector detects a battery voltage of the battery. A controller activates a circuit breaker to break an input/output circuit of the battery when the battery voltage does not match a total cell voltage obtained by adding the cell voltages.

Since the battery voltage detected by the second detector is checked by comparing it with the total cell voltage obtained from the cell voltages detected by the first detector, the self-diagnosis of the protection circuit can be performed. In other words, it can be determined whether the protection circuit is normally operating.

According to a second aspect of the present invention, the controller further activates the circuit breaker when the battery voltage does not match a power supply voltage of its own supplied from the battery.

Since the battery voltage detected by the second detector is checked by comparing it with the power supply voltage supplied from the battery to the controller, the self-diagnosis of the protection circuit can be performed in another way.

According to a third aspect of the present invention, the control device further includes a current detector for detecting current flowing through the input/output circuit, and a switch for making and cutting off the input/output circuit depending on a switching control signal received from the controller. The controller controls the switch such that the input/output circuit is cut off when a detected current is greater than a predetermined current threshold, thereafter determines whether the current detector detects the current, and when the detected current is not zero, activates the circuit breaker The switch cuts off the input/output circuit when the current detected by the current detector is greater than the predetermined current threshold. Thereafter, the controller further determines whether the protection circuit is normally operating by checking the current detector whether the current is zero. When the detected current is not zero, it means that something unusual occurs and therefore the circuit breaker is activated.

DETAILED DESCRIPTION OF THE PREFERRED EMBODIMENT

Figure 1:
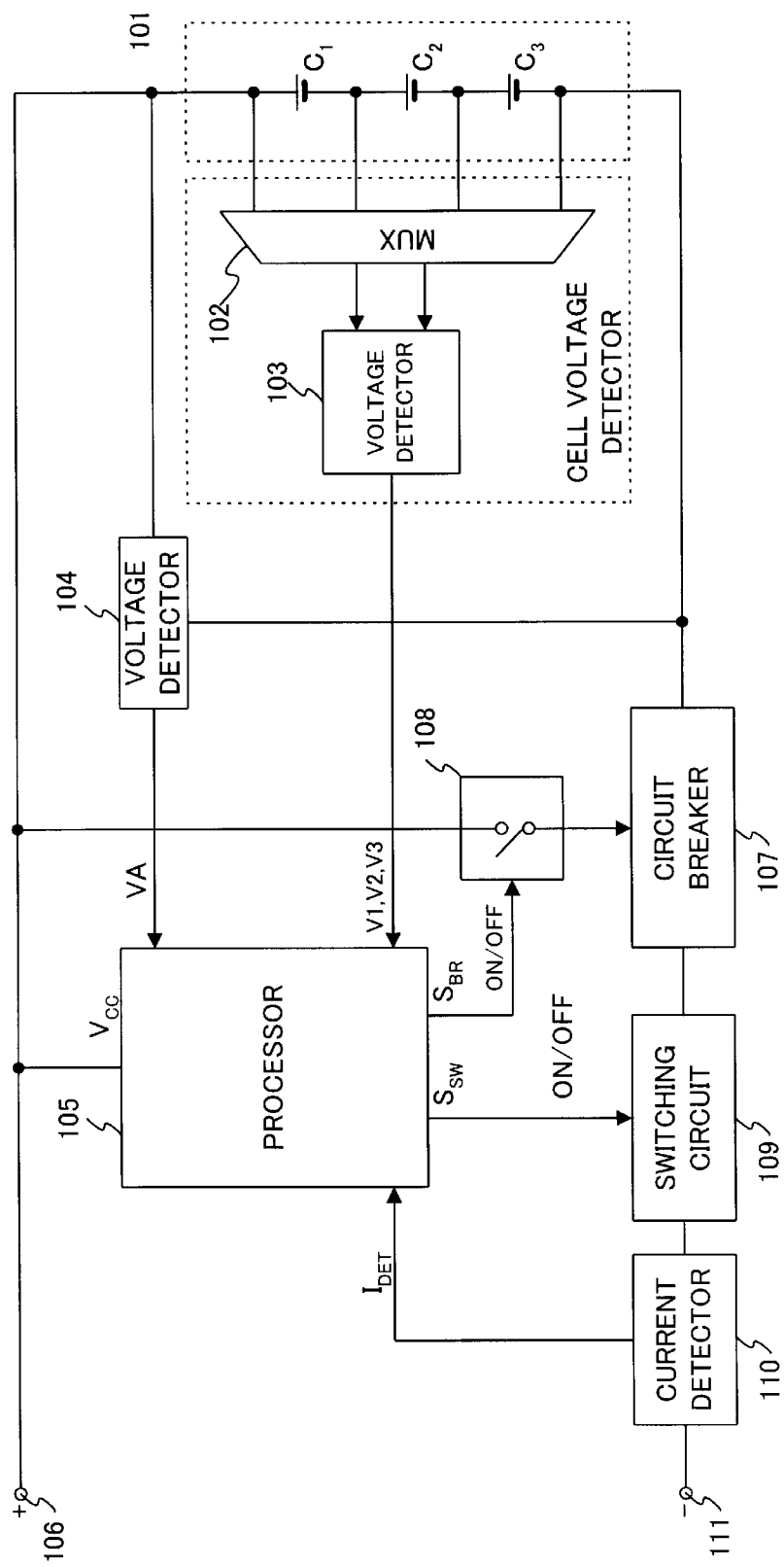
FIG. 1 is a block diagram showing a circuit of a control device in a battery pack with a protection circuit according to an embodiment of the present invention.

Referring to FIG. 1, a battery pack includes a secondary battery consisting of a plurality of rechargeable cells (for example, lithium-ion cells) placed in parallel, in series, or in a combination thereof. Here, for simplicity, three rechargeable cells $C_1$–$C_3$ are placed in series to form the secondary battery 101.

The battery pack is provided with a cell voltage detector that is designed to detect the output voltage of each of the calls $C_1$–$C_3$. In this embodiment, the cell voltage detector is composed of a multiplexer 102 and a voltage detector 103. Using the multiplexer 102 allows only one voltage detector 103 to detect the respective output voltages of the cells $C_1$–$C_3$, resulting in simplified circuit configuration of the battery pack. The multiplexer 102 has four input terminals and two output terminals and operates such that two adjacent ones of the four input terminals are sequentially connected to the two output terminals in predetermined timing. The respective four input terminals are connected to the four taps of the series-connected cells $C_1$–$C_3$ and the two output terminals are connected to the input terminals of the voltage detector 103. Therefore, the voltage detector 103 sequentially detects the respective output voltages of the cells $C_1$–$C_3$ and outputs the detected voltages V1, V2, and V3 corresponding to the cells $C_1$–$C_3$ to a processor 105.

Further, a voltage detector 104 is connected across the secondary battery 101 to detect a battery voltage of the secondary battery 101, which should be equal to a total voltage of the cells $C_1$–$C_3$ connected in series. The voltage detector 104 outputs the detected battery voltage VA to the processor 105.

The positive terminal of the secondary battery 101 is connected to a positive terminal 106 of the battery pack and a power supply terminal of the processor 105 Therefore, the power supply voltage Vcc is directly supplied to the processor 105.

On the other hand, the negative terminal of the secondary battery 101 is connected to a circuit breaker 107 which will break a circuit in the case of a switch 108 turning on. The switch 108 connects the positive terminal 106 to the circuit breaker 107 which is normally kept open but closed when receiving a circuit-breaking control signal $S_{BR}$ from the processor 105. As will be described later, once the circuit breaker 107 has broken the circuit, it is necessary to manually make the circuit.

The negative terminal of the secondary battery 101 is connected to the negative terminal 111 of the battery pack through the circuit breaker 107, a switching circuit 109, and a current detector 110. The switching circuit 109 includes an N-channel metal-oxide-semiconductor(MOS) field effect transistor (FET) which switches on and off depending on a switching control signal $S_{SW}$ received from the processor 105 to prevent the secondary battery 101 from overcharging and over-discharging. Therefore, the switching circuit 109 allows the circuit to switch between open and closed states under control of the processor 105. The current detector 110 detects a magnitude of current flowing in the circuit to output a detected current value $I_{DET}$ to the processor 105. The current detector 110 may be composed of a shunt resistor and an operational amplifier. Therefore, the processor 105 can control the switching circuit 109 such that the charging or discharging current switches on and off depending on the detected current value $I_{DET}$.

The processor 105 may be an electronic circuit including operational amplifiers. Alternatively, the same function may be implemented with software. In this embodiment, the processor 105 is a program-controlled processor on which a control program is running to perform the control operation as described hereinafter.

Figure 2:
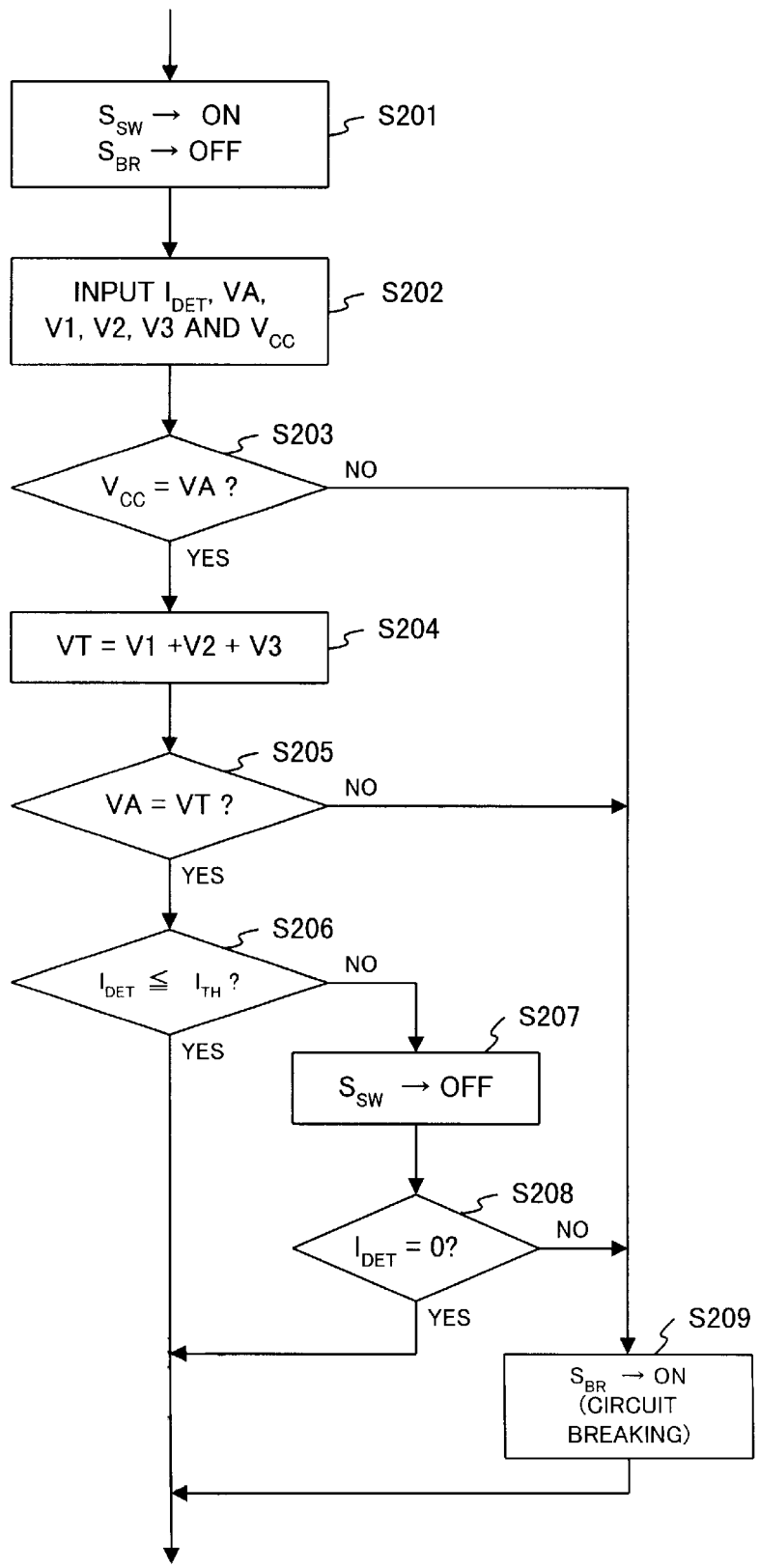
FIG. 2 is a flowchart showing an operation of the control device as shown in FIG. 1.

Referring to FIG. 2, after the control program has been activated on the processor 105, predetermined initialization is performed, that is, the switching control signal $S_{SW}$ is set to ON and the circuit-breaking control signal $S_{BR}$ to OFF (step S201). Thereafter, the processor 105 inputs the detected current value $I_{DET}$ from the current detector 110, the battery voltage VA from the voltage detector 104, the cell voltages V1–V3 from the voltage detector 103, and the power supply voltage Vcc with which the processor 105 Itself is now supplied (step S202). The cell voltages V1–V3 are received by controlling the timing of the multiplexer 102.

First, it is determined whether the power supply voltage Vcc is substantially equal to the battery voltage VA (step S203). When the voltage detector 104 and the processor 105 are normally operating, the power supply voltage Vcc should be equal to the battery voltage VA. Therefore, if Vcc is not equal to VA, more specifically, if the difference between Vcc and VA is greater than a predetermined threshold (NO in step S203), it is determined that something unusual occurs in at least one of the voltage detector 104 and the processor 105. When it is determined that something unusual occurs, the circuit-breaking control signal $S_{BR}$ is set to ON (step S209) and the circuit breaker 107 is activated to break the circuit, protecting the secondary battery 101 from overcharging, over-discharging, or something unusual.

When the power supply voltage Vcc is substantially equal to the battery voltage VA, that is, the difference between Vcc and VA is not greater than the predetermined threshold (YES in step S203), the detected cell voltages V1–V3 inputted from the voltage detector 103 are added to produce a total cell voltage VT. Then, it is determined whether the total cell voltage VT is substantially equal to the battery voltage VA (stop S205). When all of the multiplexer 102, the voltage detectors 103 and 104, and the processor 105 are in normal conditions, the total cell voltage VT should be equal to the battery voltage VA. Therefore, if VA is not equal to VT, more specifically, if the difference between VA and VT is greater than a predetermined threshold (NO in step S205), it is determined that something unusual occurs in at least one of the multiplexer 102, the voltage detectors 103 and 104, and the processor 105. When it is determined that something unusual occurs, the circuit-breaking control signal $S_{BR}$ is set to ON (step S209).

When the total cell voltage VT is substantially equal to the battery voltage VA (YES in step S205), it is further determined whether the detected current $I_{DET}$ is equal to or lower than a predetermined current value $I_{TH}$ (step S206). When the detected current $I_{DET}$ exceeds $I_{TH}$ (NO in step S206), the switching control signal $S_{SW}$ is set to OFF, which causes the switching circuit 109 to turn off (step S207). If the switching circuit 109 normally operates, then the switching circuit 109 makes the circuit open, so that the charging or discharging current is cut off. To confirm it, it is determined whether the detected current value $I_{DET}$ is equal to zero (step S208).

If the detected current value $I_{DET}$ is not equal to zero after the switching control signal $S_{SW}$ has been set to OFF (NO in step S208), it is determined that something unusual occurs. When it is determined that something unusual occurs in at least one of the switching circuit 109 and the current detector 110, the circuit-breaking control signal $S_{BR}$ is set to ON so that the circuit is broken (step S209).

When the detected current $I_{DET}$ is equal to or lower than a predetermined current value $I_{TH}$ (YES in step S206) or when the detected current value $I_{DET}$ is equal to zero after the switching control signal $S_{SW}$ has been set to OFF (YES in step S208), it is determined that all circuits are normally operating.

In the above-described manner, in the case where it is determined that something unusual occurs in the protection circuit, the processor 105 sets the circuit-breaking control signal $S_{BR}$ is set to ON so that the circuit is broken to protect the secondary battery 101. Since the circuit breaker 107 cannot make the circuit closed again without manually replacing a specific part with a new one, perfect protection can be achieved.

Figure 3:
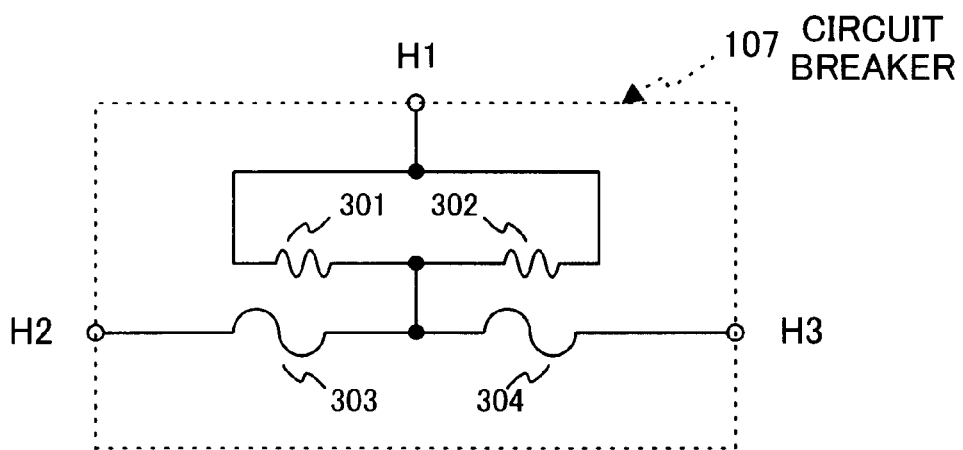
FIG. 3 is a circuit diagram showing an example of a circuit breaker used in the protection circuit.

Referring to FIG. 3, the circuit breaker 107 is composed of a pair of heaters 301 and 302 connected in parallel and a pair of fuses 303 and 304 connected in series. The respective fuses 303 and 304 are placed near the heaters 301 and 302 so that the respective heaters 301 and 302 cause the fuses 303 and 304 to be burnt. One end of the parallel heaters 301 and 302 is connected to a terminal H1 and the other end thereof is connected to a connection point of the fuses 303 and 304. The other ends of the fuses 303 and 304 are connected to terminals H2 and H3, respectively.

The terminal H1 is connected to the switch 108 and the terminal H2 is connected to the switching circuit 109, and the terminal H3 is connected to the negative terminal of the secondary battery 101, as shown in FIG. 1. Therefore, in the case of charging, when the switch 108 is turned on, the charging voltage on the positive terminal 106 is applied to the terminal H1 through the switch 108 and current flows through the parallel heaters 301 and 302 and the fuse 303. The current causes the heaters 301 and 302 to heat up and burn the fuses 303 and 304. Since both fuses 303 and 304 are concurrently blown, a short circuit is prevented from occurring between the secondary battery 101 and the heaters 301 and 302.

On the other hand, in the case of discharging, when the switch 108 is turned on, the discharging voltage of the secondary battery 101 is applied to the terminal H1 through the switch 108 and current flows through the parallel heaters 301 and 302 and the fuse 304. The current causes the heaters 301 and 302 to heat up and burn the fuses 303 and 304. Since both fuses 303 and 304 are concurrently blown, a short circuit is prevented from occurring between the positive and negative terminals 106 and 111 through the circuit breaker 107 when an external circuit has been connected to the battery pack.

What is claimed is:

1. In a battery pack including a battery composed of a plurality of secondary cells placed in a predetermined connection, a control device for a protection circuit of the battery from over-charging/discharging, the control device comprising:

a first detector for detecting cell voltages of the secondary cells, respectively;

a second detector for detecting a battery voltage of the battery;

a circuit breaker for breaking an input/output circuit of the battery; and a controller for activating the circuit breaker when the battery voltage does not match a total cell voltage obtained by adding the cell voltages.

2. The control device according to claim 1, wherein the controller determines that at least one of the first detector, the second detector, and the controller itself is in an abnormal condition when the battery voltage does not match the total cell voltage.

3. The control device according to claim 1, wherein the circuit breaker irreversibly breaks the input/output circuit of the battery and manually makes the input/output circuit.

4. The control device according to claim 3, wherein the circuit breaker comprises:

a fuse connected to the input/output circuit; and a heater placed near the fuse, for burning the fuse according to a control signal received from the controller.

5. The control device according to claim 1, wherein the controller further activates the circuit breaker when the battery voltage does not match a power supply voltage of its own supplied from the battery.

6. The control device according to claim 5, wherein the controller determines that at least one of the second detector and the controller itself is in an abnormal condition when the battery voltage does not match the power supply voltage.

7. The control device according to claim 1, further comprising:

a current detector for detecting current flowing through the input/output circuit; and a switch for making and cutting off the input/output circuit depending on a switching control signal received from the controller, wherein the controller controls the switch such that the input/output circuit is cut off when a detected current is greater than a predetermined current threshold, thereafter determines whether the current detector detects the current, and when the detected current is not zero, activates the circuit breaker.

8. The control device according to claim 7, wherein the controller determines that at least one of the switch, the current detector, and the controller itself is in an abnormal condition when the detected current is not zero.

9. The control device according to claim 7, wherein the controller further activates the circuit breaker when the battery voltage does not match a power supply voltage of its own supplied from the battery.

10. In a battery pack including a battery composed of a plurality of secondary cells placed in a predetermined connection, a control method for controlling a protection circuit of the battery from over-charging/discharging, the control method comprising the steps of:

a) detecting cell voltages of the secondary cells, respectively;

b) detecting a battery voltage of the battery;

c) comparing the battery voltage with a total cell voltage obtained by adding the cell voltages; and d) breaking an input/output circuit of the battery when the battery voltage does not match the total cell voltage.

11. The control method according to claim 10, wherein in the step d), the input/output circuit of the battery is irreversibly broken and manually made.

12. The control method according to claim 11, wherein the step d) comprises the step of burning a fuse connected to the input/output circuit when the battery voltage does not match the total cell voltage.

13. The control method according to claim 10, further comprising the step of breaking the input/output circuit when the battery voltage does not match a power supply voltage supplied from the battery.

14. The control method according to claim 10, further comprising the steps of:

detecting current flowing through the input/output circuit; and cutting off the input/output circuit when a detected current is greater than a predetermined current threshold;

determining whether the current is detected; and breaking the input/output circuit when the detected current is not zero.

15. The control method according to claim 14, further comprising the step of breaking the input/output circuit when the battery voltage does not match a power supply voltage of its own supplied from the battery.

16. A battery pack comprising:

a batty composed of a plurality of secondary cells placed in a predetermined connection;

a protection circuit of the battery from over-charging/discharging;

a first detector for detecting cell voltages of the secondary cells, respectively;

a second detector for detecting a battery voltage of the battery;

a circuit breaker for breaking an input/output circuit of the battery; and a controller for activating the circuit breaker when the battery voltage does not match a total cell voltage obtained by adding the cell voltages.

17. The battery pack according to claim 16, wherein the controller determines that at least one of the first detector, the second detector, and the controller itself is in an abnormal condition when the battery voltage does not match the total cell voltage.

18. The battery pack according to claim 16, wherein the circuit breaker irreversibly breaks the input/output circuit of the battery and manually makes the input/output circuit.

19. The battery pack according to claim 18, wherein the circuit breaker comprised:

a fuse connected to the input/output circuit; and a heater placed near the fuse, for burning the fuse according to a control signal received from the controller.

20. The battery pack according to claim 16, wherein the controller further activates the circuit breaker when the battery voltage does not match a power supply voltage of its own supplied from the battery.

21. The battery pack according to claim 16, further comprising:

a current detector for detecting current flowing through the input/output circuit; and a switch for making and cutting off the input/output circuit depending on a switching control signal received from the controller, wherein the controller controls the switch such that the input/output circuit is cut off when a detected current is greater than a predetermined current threshold, thereafter determines whether the current detector detects the current, and when the detected current is not zero, activates the circuit breaker.

22. The battery pack according to claim 21, wherein the controller further activates the circuit breaker when the battery voltage does not match a power supply voltage of its own supplied from the battery.

* * * * *